(12) United States Patent
Torino

(10) Patent No.: US 8,362,628 B2
(45) Date of Patent: Jan. 29, 2013

(54) PORTABLE POWER GENERATOR

(76) Inventor: Kenneth Torino, Colchester, VT (US)

( * ) Notice: Subject to any disclaimer, the term of this patent is extended or adjusted under 35 U.S.C. 154(b) by 0 days.

(21) Appl. No.: 12/926,291

(22) Filed: Nov. 8, 2010

(65) Prior Publication Data

US 2012/0112470 A1    May 10, 2012

(51) Int. Cl.
*H02K 7/18* (2006.01)
(52) U.S. Cl. .......................................... 290/1 R
(58) Field of Classification Search ............... 290/1 R
See application file for complete search history.

(56) References Cited

U.S. PATENT DOCUMENTS

| | | | | |
|---|---|---|---|---|
| 1,015,298 | A | * | 1/1912 | Cleland ........................ 185/39 |
| 1,366,461 | A | * | 1/1921 | Johnson ........................ 362/192 |
| 3,471,706 | A | * | 10/1969 | Schneider ..................... 307/10.1 |
| 3,676,694 | A | * | 7/1972 | Schneider et al. ............ 307/10.1 |
| 4,227,092 | A | * | 10/1980 | Campagnuolo et al. ...... 290/1 C |
| 4,412,355 | A | | 10/1983 | Terbrack et al. |
| 4,596,933 | A | * | 6/1986 | Waechter et al. .............. 250/388 |
| 5,355,300 | A | * | 10/1994 | Zinn ............................. 363/146 |
| 5,434,558 | A | * | 7/1995 | Zeder ........................... 340/568.3 |
| 5,949,215 | A | | 9/1999 | Takakura |
| 6,281,594 | B1 | | 8/2001 | Sarich |
| 6,291,900 | B1 | * | 9/2001 | Tiemann et al. .............. 290/1 A |
| 6,522,040 | B2 | * | 2/2003 | You ............................. 310/96 |
| 6,788,504 | B2 | | 9/2004 | Vanderkolk |
| 6,858,951 | B2 | * | 2/2005 | Liao ............................. 290/1 C |
| 6,914,340 | B2 | * | 7/2005 | Becker et al. ................. 290/1 R |
| 6,930,403 | B2 | * | 8/2005 | Hartman et al. .............. 290/1 A |
| 6,963,186 | B2 | | 11/2005 | Hobbs |
| 7,129,592 | B1 | | 10/2006 | Yetter |
| 7,253,534 | B2 | * | 8/2007 | Vasilovich et al. ........... 290/1 R |
| 7,292,006 | B2 | | 11/2007 | Horiuchi |
| 7,327,046 | B2 | | 2/2008 | Biamonte |
| 7,402,915 | B2 | * | 7/2008 | Hutchinson et al. .......... 290/1 A |
| 7,411,371 | B2 | | 8/2008 | Hobbs |
| 7,485,992 | B2 | * | 2/2009 | Ekchian et al. ................ 310/37 |
| 7,608,933 | B2 | * | 10/2009 | Yang ............................. 290/1 C |
| 7,741,804 | B2 | * | 6/2010 | Fridhendler et al. .......... 320/101 |
| 8,115,327 | B2 | * | 2/2012 | Yomoda et al. ............... 290/1 E |
| 2005/0200221 | A1 | | 9/2005 | Vasilovich et al. |
| 2007/0285053 | A1 | | 12/2007 | Noguchi et al. |
| 2008/0157536 | A1 | | 7/2008 | Bulthaup et al. |

FOREIGN PATENT DOCUMENTS

JP      2012105532 A   *   5/2012

* cited by examiner

*Primary Examiner* — Joseph Waks
(74) *Attorney, Agent, or Firm* — H. Jay Spiegel

(57) ABSTRACT

A portable power generator employs high voltage DC, at standard AC voltages and using standard AC connectors. Since switching chargers immediately rectify the 120-240 Volt single phase AC input, a 120-240 Volt DC source is acceptable to drive these chargers. A high frequency conversion to AC and a step up transformer is one approach and the second approach uses an inductor in a boost circuit. Mechanically a hand crank and pedal powered mechanism are used. In a first embodiment, a one dynamo (generator) 10 watt hand crank model can drive the charger for a complete range of portable devices except laptops. In a second embodiment, a two dynamo (generator) model operated with pedals can drive a small 20 watt laptop. The invention contemplates use of either one generator or two generators in parallel or in series. Additional generators over two can also be employed.

22 Claims, 18 Drawing Sheets

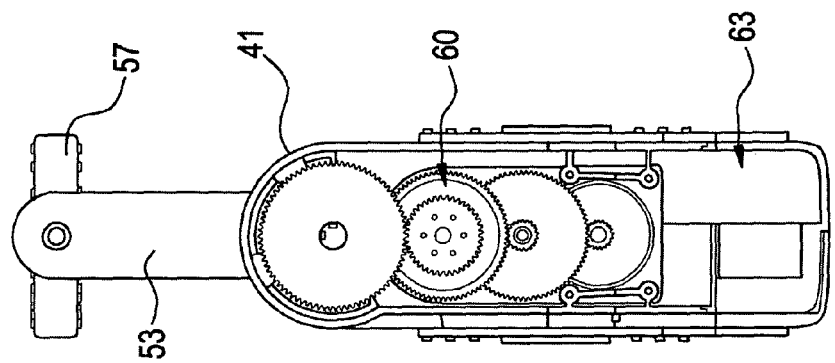
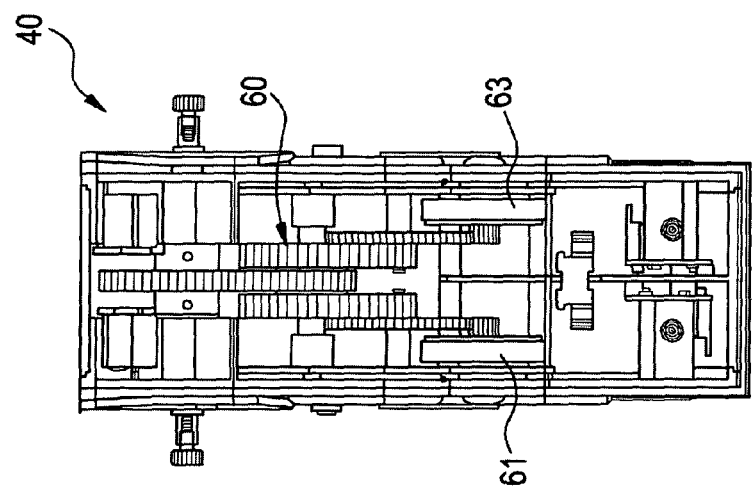

PORTABLE POWER GENERATOR

BACKGROUND OF THE INVENTION

The present invention relates to a portable power generator. A portable power source needs to be light, easy to use, and produce sufficient power in a form that is useful. Over the last twenty years, numerous mobile devices including cell phones, smart phones, laptops, GPS navigation, mp3 players, digital cameras, and camcorders have all been developed. They are all limited by their battery life and would benefit from a portable power source.

Devices exist that are full sized generators. Their size precludes them from being portable or pocket sized. They are also more expensive. Some have a low voltage DC interface with several problems. They have to interface directly with numerous mechanical and electrical interfaces such as diverse types of plugs. If underpowered, they can trickle charge but this extends the charging time. Some have an AC interface. This can only be achieved with more expensive electronics and/or large heavy components like transformers or larger generators and with lower conversion efficiency.

The electrical output of "mini dynamos" is, by virtue of their small size, low power and low voltage. Devices in existence today have used mini dynamos to product low voltage DC to directly trickle charge batteries for flashlights and some cell phones. As stated above, the benefit of low voltage DC is the DC interface will allow an underpowered source to trickle charge. Their two drawbacks are (1) their underpowered generators extend the cranking time needed to charge, and (2) the low voltage DC interface has to support many DC interfaces. This limits the usefulness of these devices to one dedicated application or a limited number of them with attachments for each interface. The present invention, by contrast, uses one or more dynamos and overcomes the difficulties involved in converting a low power AC source to drive the chargers for a complete range of applications.

Applicant is aware of the following prior art:

U.S. Pat. No. 6,522,040 to You discloses a mechanism for translating human power input to rotation of a generator including multiple gears stepping up the speed of revolution. From FIG. 11 of You, it is apparent that You generates a low level DC voltage since its output is directly connected to a cell telephone coupling.

Published Application No. US 2005/0200221 A1 to Vasilovich et al. discloses an apparatus for converting human power to electrical power. Vasilovich et al. disclose generation of 110 VAC power as well as 110-120 AC/DC inverter output. However, the disclosure at paragraph [0069] specifically describes the inverter 27 as converting direct current electrical energy into alternating current electrical energy.

U.S. Pat. No. 6,788,504 to Vanderkolk discloses conversion of DC power to single phase power as well as typical household outlets as shown in FIG. 2 thereof. Vanderkolk teaches an output of 110 VAC.

U.S. Pat. No. 5,949,215 to Takakura discloses a small size battery charger that operates through rotation of a handle. Takakura fails to teach or suggest generation of high DC voltage.

U.S. Pat. No. 6,930,403 to Hartman et al. discloses a mobile electrical power source including a crank assembly that is rotated to generate power. Hartman et al. do not teach or suggest generation of high DC voltage.

U.S. Pat. No. 7,129,592 to Yetter teaches a further example of a human powered electrical energy source in several embodiments. Yetter discloses either generation of DC voltage or AC power. The AC power may be single or three phase (column 4, beginning at line 62).

Other portable power sources are disclosed in U.S. Pat. Nos. 4,412,355 to Terbrack et al.; 6,281,594 to Sarich; 6,963,186 to Hobbs; 7,292,006 to Horiuchi; 7,327,046 to Biamonte; 7,411,371 to Hobbs; as well as Published Application Nos. US 2007/0285053 A1 to Noguchi et al. and US 2008/0157536 A1 to Bulthaup et al.

The present invention differs from the teachings of the prior art listed and discussed above by providing a portable, compact, efficient and cost-effective power source made up of singular or multiple generators that is/are human powered, provides an output of 120-240 volts DC, and includes a home-type electrical receptacle so that the typical charger used with portable devices may easily be plugged in and used.

SUMMARY OF THE INVENTION

The present invention relates to a portable power generator. The present invention solves the problems of the prior art with a novel approach by using high voltage DC, at standard AC voltage levels such as 120-240 Volts and using standard AC connectors. Since switching chargers immediately rectify the 120-240 Volt single phase AC input, a 120-240 Volt DC source is acceptable to drive these chargers. This allows a more efficient DC to DC converter to be used. Two electrical and two mechanical approaches were used. A high frequency conversion to AC and a step up transformer is one approach and the second approach uses an inductor in a boost circuit. Mechanically a hand crank and pedal powered mechanism are used.

Two embodiments have been developed. First, a one dynamo 10 watt hand crank model can drive the charger for a complete range of portable devices except laptops. Second, a two dynamo model can drive a small 20 watt laptop. The mechanical interface needs to be easy to use and comfortable to operate. Two methods are used. For the smaller device, a hand crank is attached to the generator. The hand crank handle, rotating knob, folds out for easy operation without compromising on the compact size. For the second model, two pedals drive an internal shaft like a tricycle. The second model allows the operator to drive more power and use the device while sitting, hands free. One innovative feature of the second model is the incorporation of two generators in the legs that support the axle connected to the pedals.

Accordingly, it is a first object of the present invention to provide a portable power generator.

It is a further object of the present invention to provide such a device in which human power is translated into direct current power at a voltage of in the range of 120-240 volts.

It is a further object of the present invention to provide such a device in which a standard household electrical receptacle is incorporated therein so that the typical 120 VAC two blade plug or a 240 VAC two pin plug accompanying a charger for a low powered DC device may easily be plugged into the invention.

It is a still further object of the present invention to provide such a device in which power is provided, either by turning a hand crank or by pedaling pedals in a hands-free mode.

These and other objects, aspects and features of the present invention will be better understood from the following detailed description of the preferred embodiments when read in conjunction with the appended drawing figures.

BRIEF DESCRIPTION OF THE DRAWINGS

FIG. 8 shows an end view of the second embodiment with parts removed to show detail.

FIG. 9 shows a side view of the second embodiment with parts removed to show detail.

SPECIFIC DESCRIPTION OF THE PREFERRED EMBODIMENTS

Figure 1:
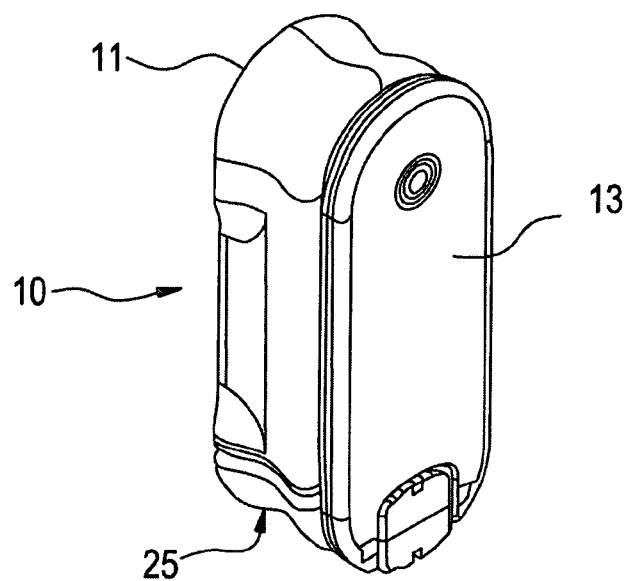
FIG. 1 shows a front side perspective view of a first embodiment of the present invention.
Figure 2:
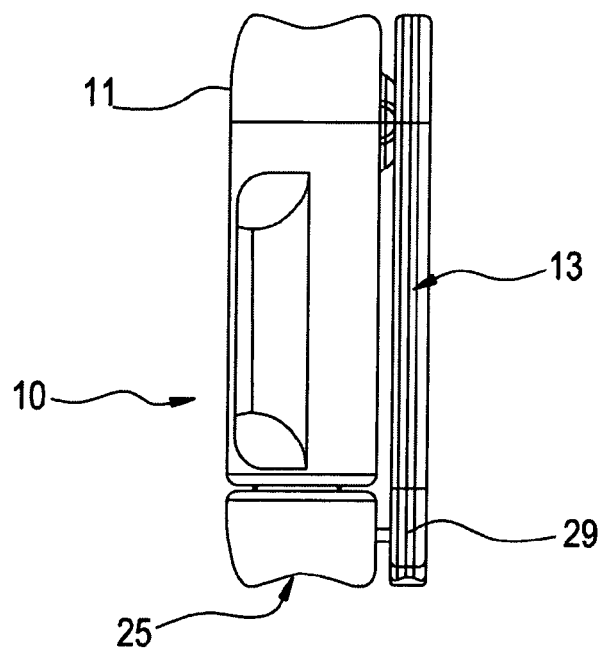
FIG. 2 shows a side view of the embodiment of FIG. 1.
Figure 3:
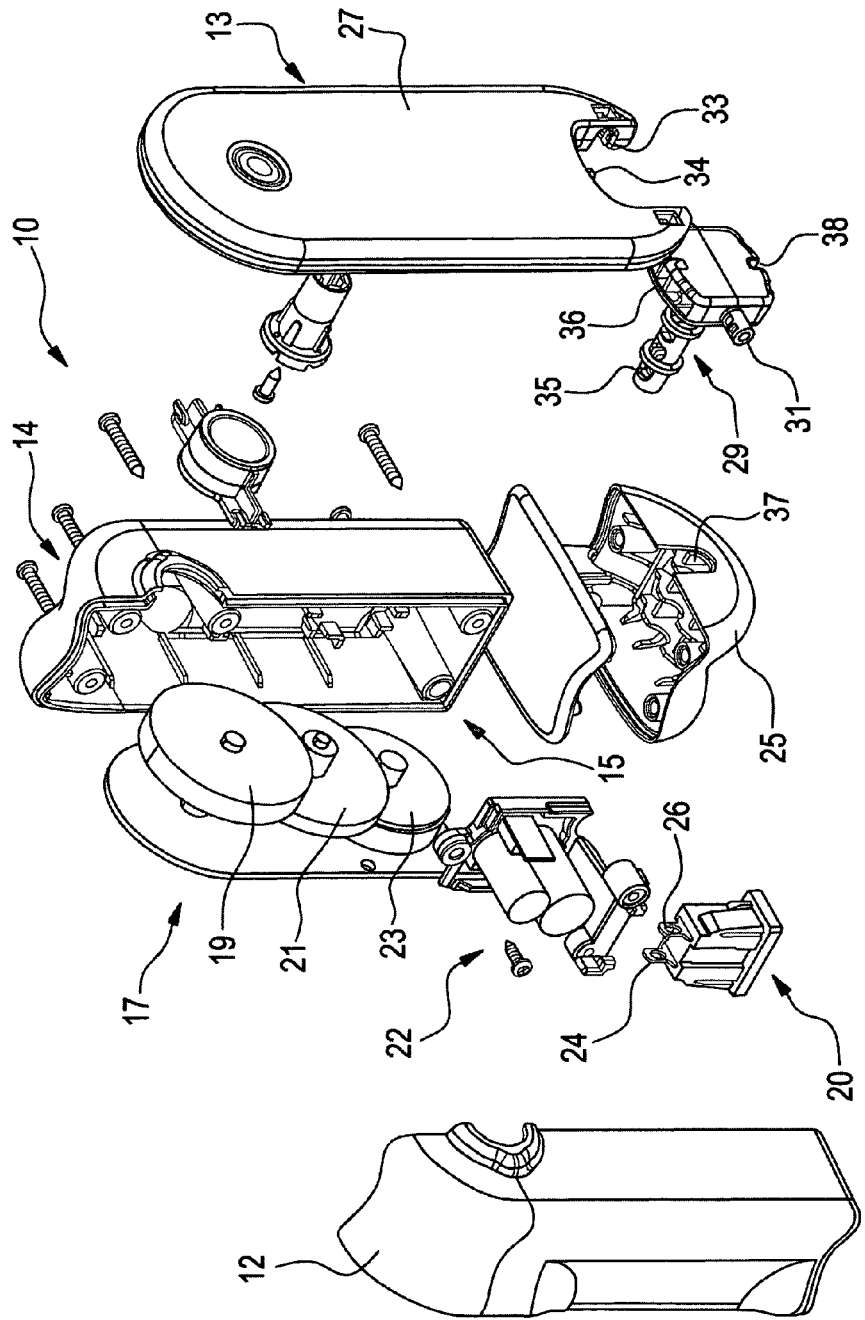
FIG. 3 shows an exploded perspective view of the first embodiment of the present invention.
Figure 4:
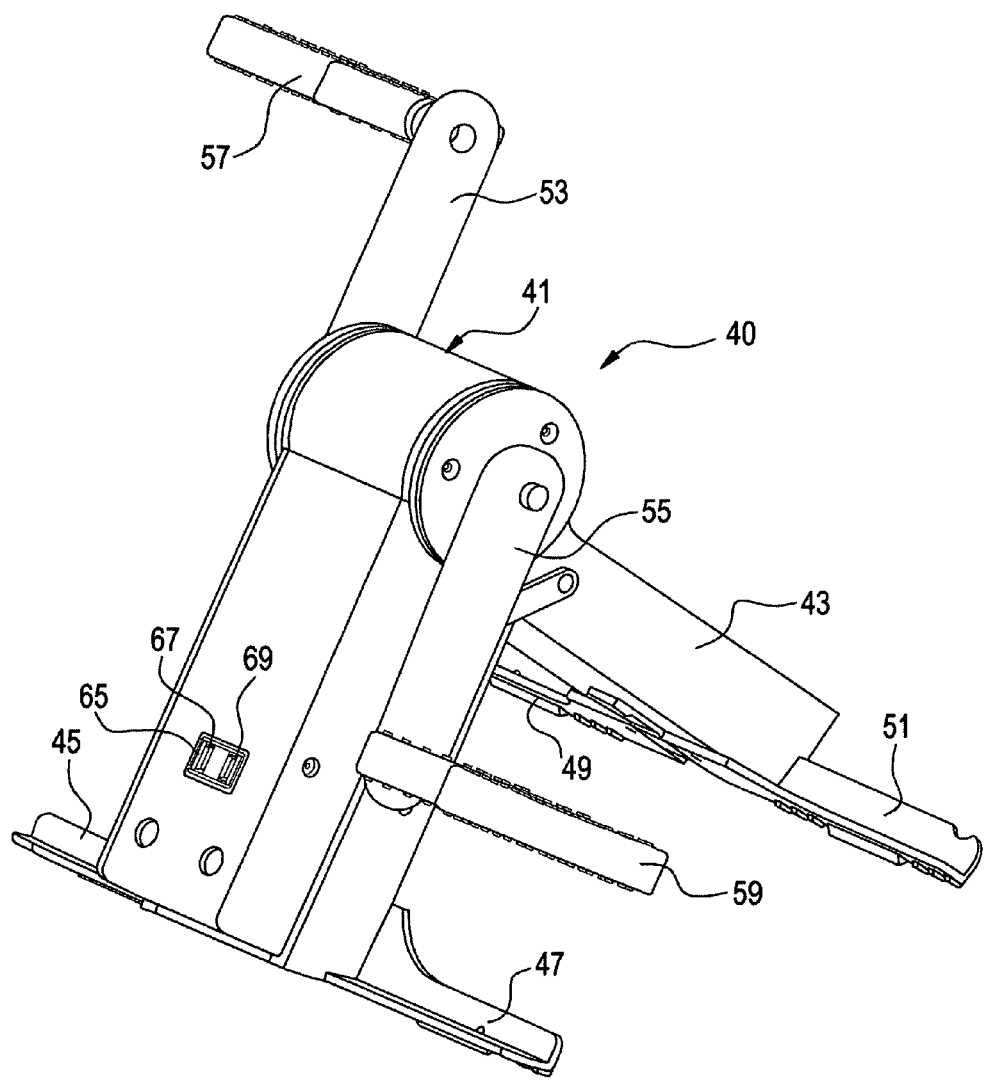
FIG. 4 shows a front side perspective view of a second embodiment of the present invention.
Figure 5:
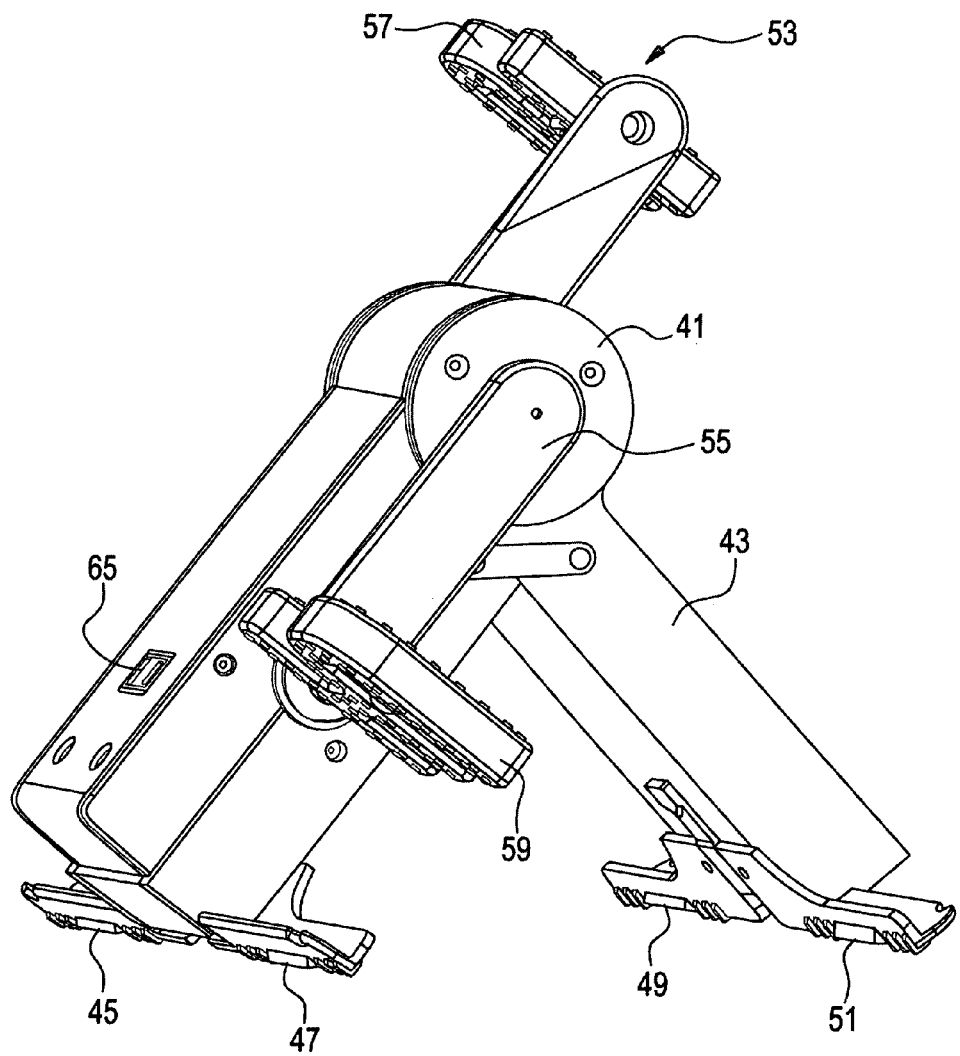
FIG. 5 shows a side perspective view of the second embodiment.
Figure 6:
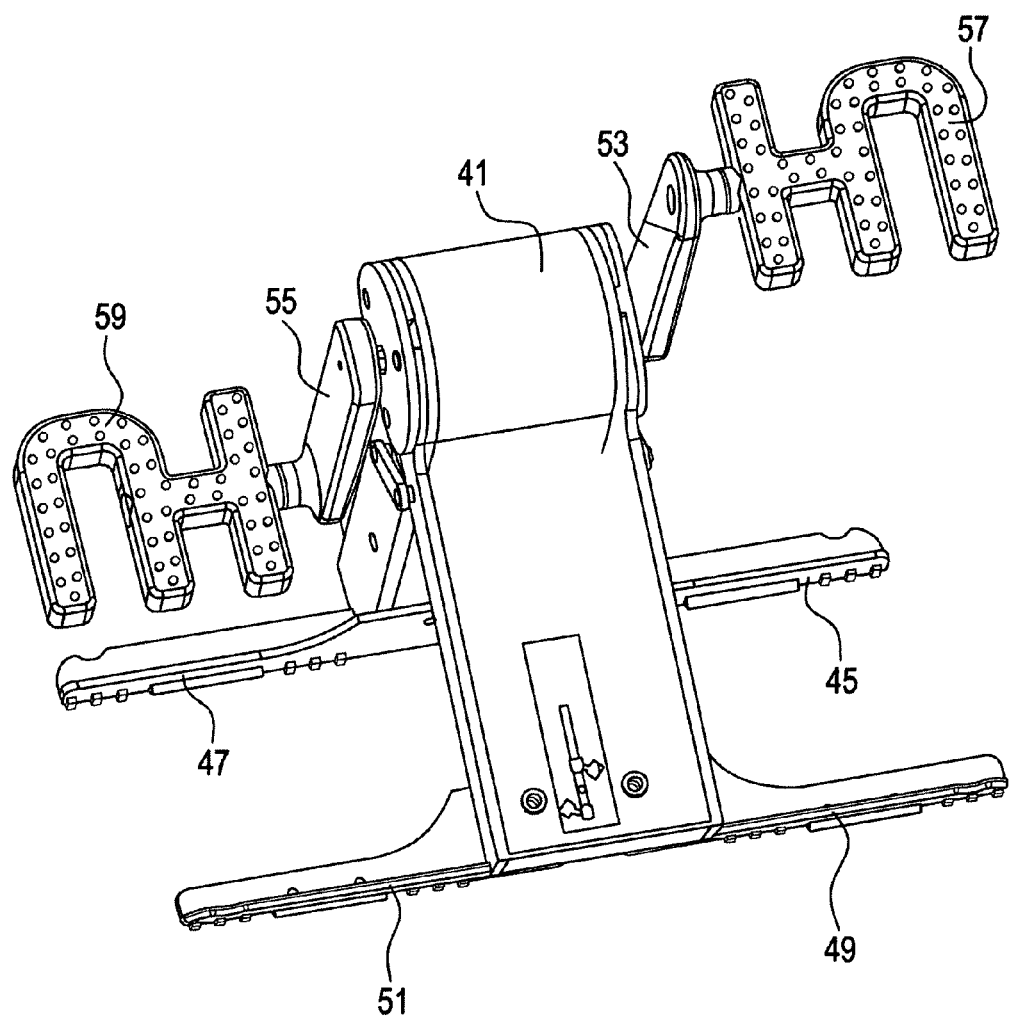
FIG. 6 shows a rear view in perspective of the second embodiment.
Figure 7:
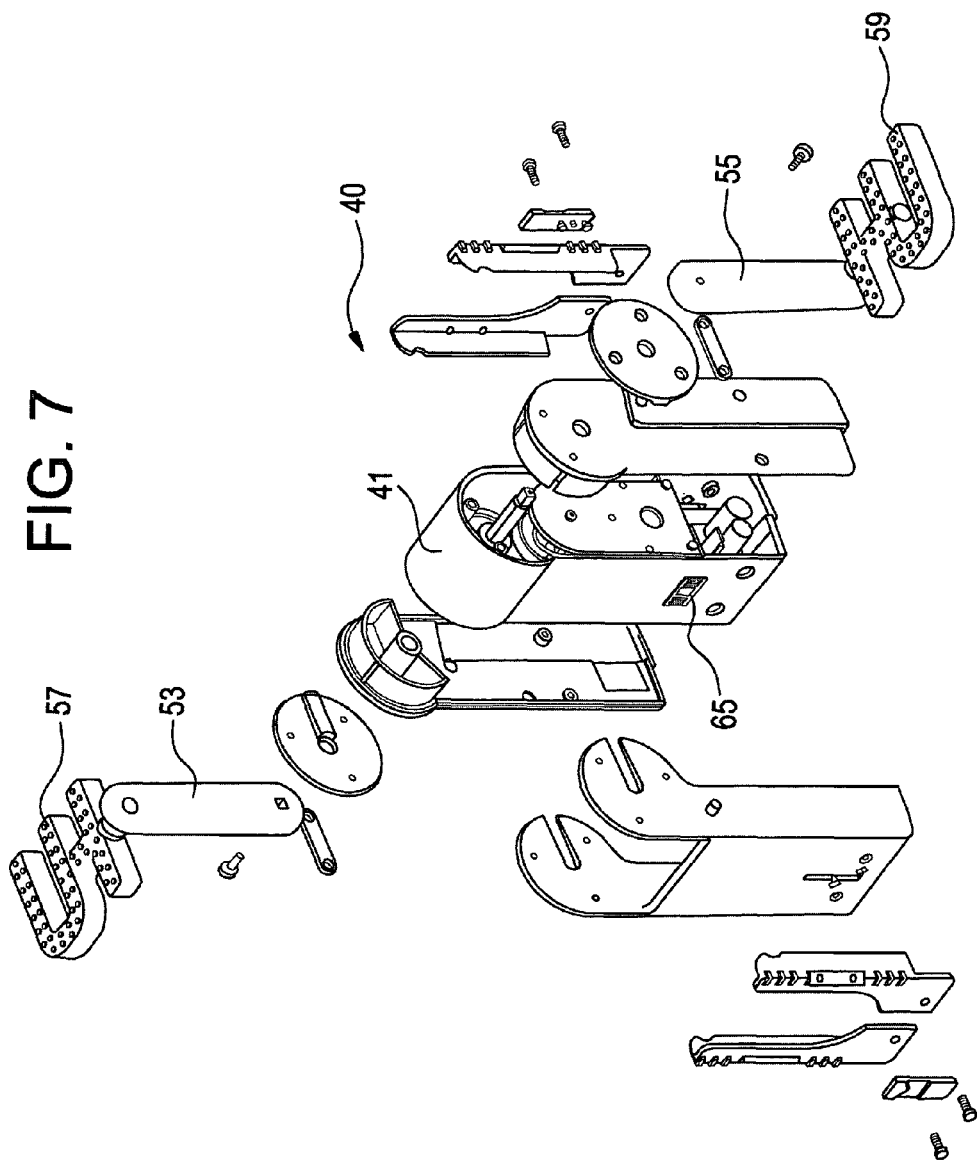
FIG. 7 shows an exploded perspective view of the second embodiment.

Reference is first made to FIGS. 1-3. Therein, the first embodiment of the present invention is generally designated by the reference numeral 10 and includes a housing 11 and an actuator 13. The housing 11 has an internal chamber 15 (FIG. 3) in which a transmission 17 is located including a plurality of gears 19, 21 and 23. Preferably, the gear ratio is set such that turning the crank 13 twice a second results in rotation of the output shaft of the transmission 17 at 2,800 revolutions per minute (rpm). Transmission 17 is coupled to a generator system 22 that includes a generator as well as the electrical circuitry schematically depicted in FIG. 10. The output of the electrical circuitry is coupled to the connectors 24 and 26 of a female receptacle 20 that includes two connector ports as is the case with a typical home 120 or 240 VAC electrical outlet.

Figure 13:
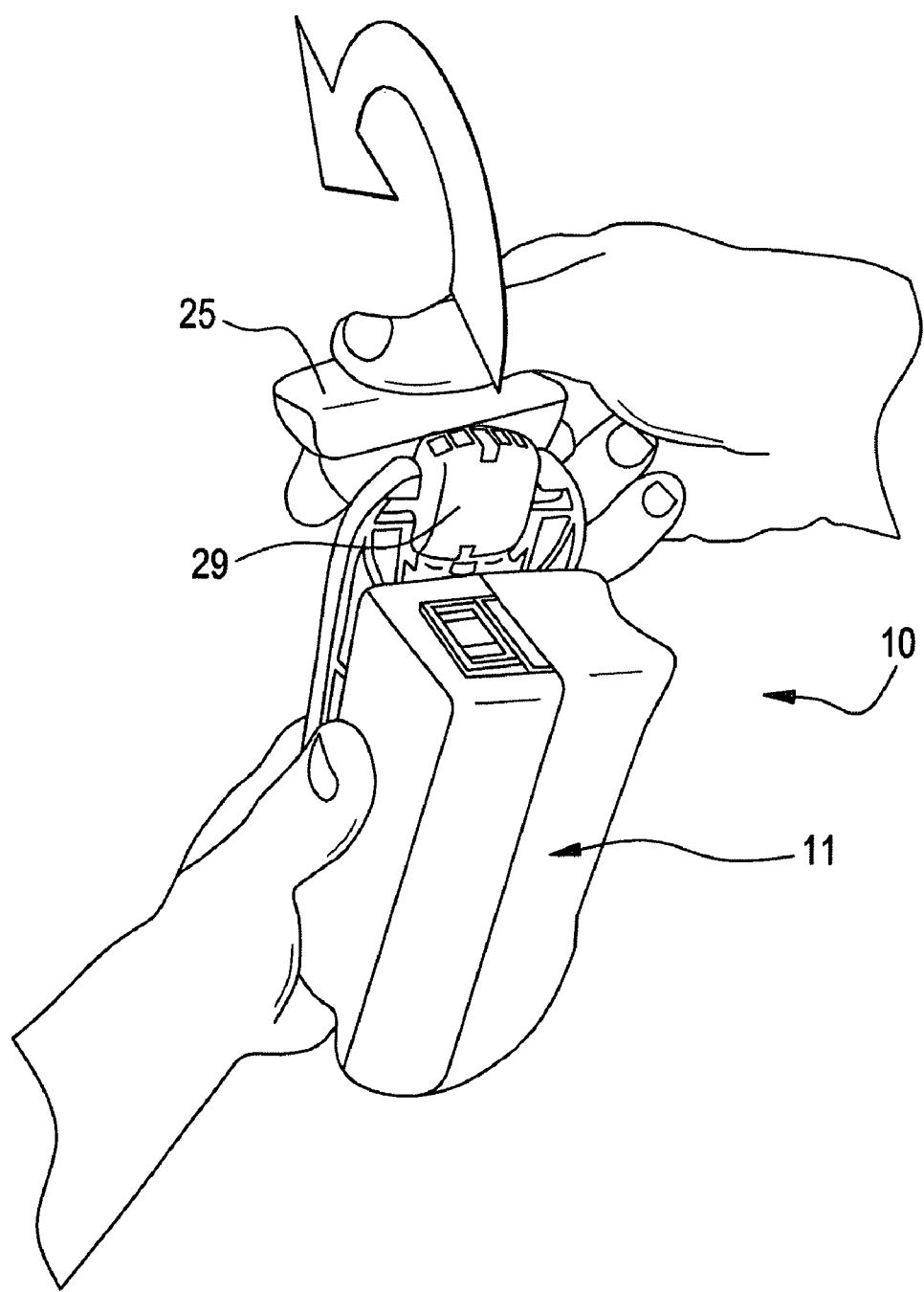
Figure 16:
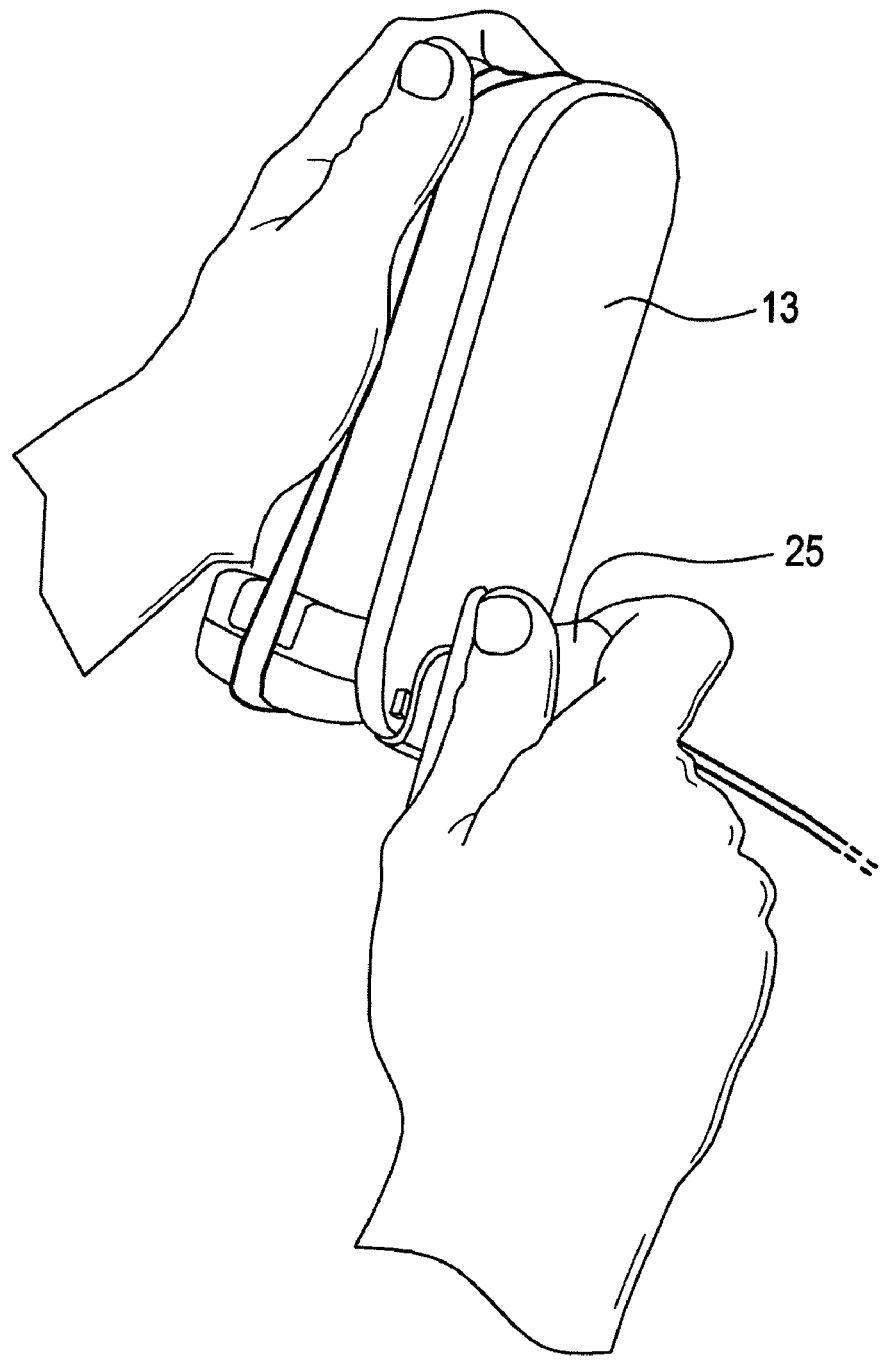
Figure 17:
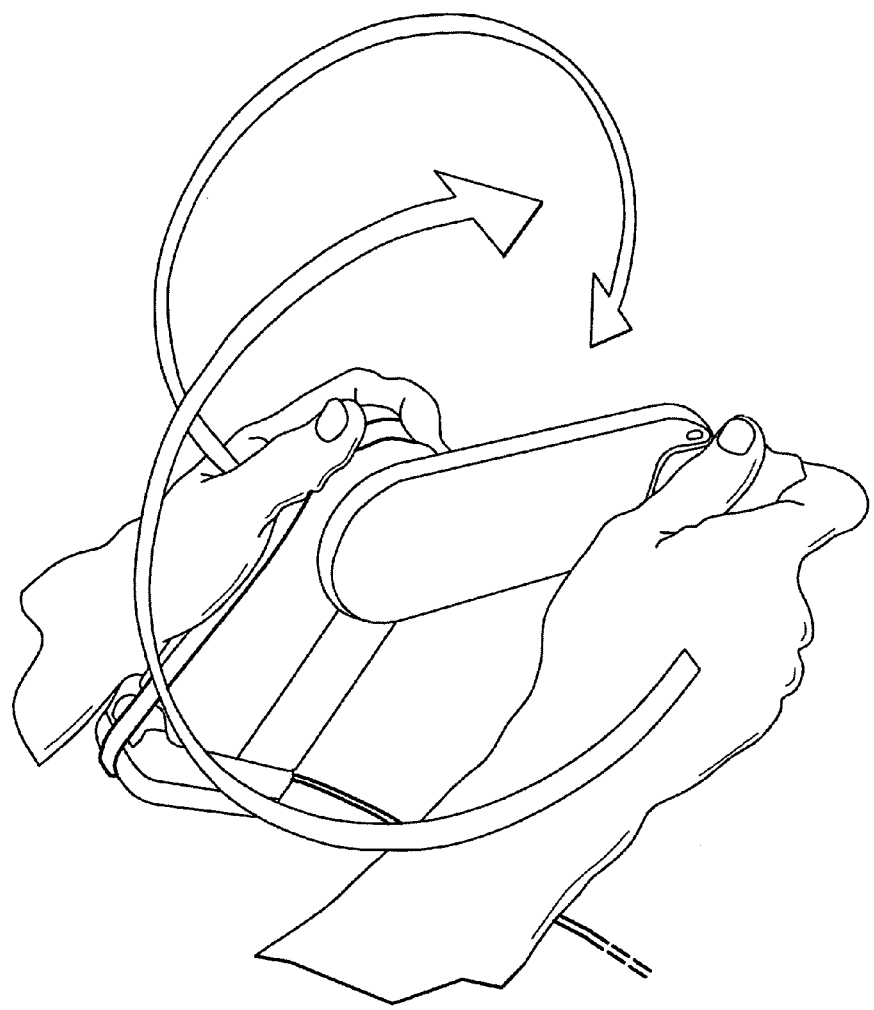

As shown in FIG. 3, the housing 11 includes housing halves 12 and 14. The actuator 13 includes a grasping handle 25 connected to a flat crank arm 27 by a coupling mechanism 29. The coupling mechanism 29 is pivotably mounted on the handle by virtue of diametrically opposed posts 31 received in openings 33 in the crank arm 27. The coupling 29 has a post 35 received in a recess 37 formed in the grasping handle 25. As shown in FIG. 1, when the device 10 is not in use, the crank arm 27 and grasping handle 25 are in the position shown. When it is desired to rotate the crank arm 27 to generate electricity, first the crank arm 27 is slightly rotated with the grasping handle 25 in the position shown in FIG. 1. Thereafter, the grasping handle 25 is pivoted with the coupling 29 until it assumes the position shown in FIGS. 13 and 16-17, whereupon it can be rotated as shown in FIG. 17 to cause electricity to be generated. With further reference to FIG. 3, the crank arm 27 includes a detent 33 that can enter either one of the recesses 36, 38 in the coupling mechanism 29 to releasably lock the handle in either of its two alternative orientations.

With reference now to FIGS. 4-9, a second embodiment of the present invention is generally designated by the reference numeral 40 and includes a housing 41 as well as a support stand including an outstretched leg 43 and feet 45, 47, 49 and 51, which preferably support the inventive device on a floor surface.

A pair of cranks 53 and 55 include respective pedals 57 and 59 that are offset 180 degrees with respect to one another and may be engaged preferably by the feet of the user to rotate the cranks 53 and 55 which are coupled to a transmission 60 (FIGS. 8 and 9) to convert pedal movement to a higher rotative speed such as converting rotations at 1.5 revolutions per second to 2,800 rpm at the output of the transmission 60. The transmission 60 is coupled to two generator systems 61 and 63, each of which corresponds to the generator system 22 as shown in FIG. 3. Each of these generator systems includes a generator and the electrical circuitry as schematically depicted in FIG. 10. An electrical receptacle 65 (FIGS. 4 and 5) including two openings 67 and 69 corresponding to the openings in a typical household 120 or 240 VAC receptacle are included.

Figure 11:
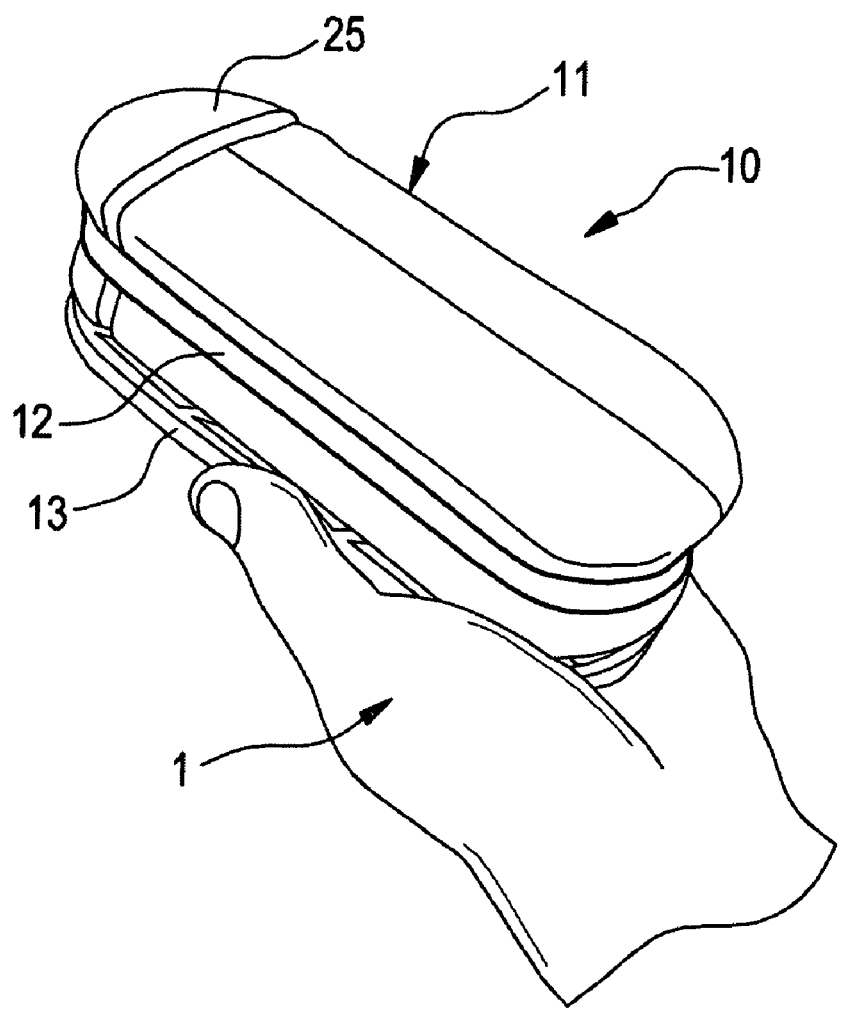
FIGS. 11-17 show a sequential explanation of the manner of operation of the first embodiment of the present invention.
Figure 12:
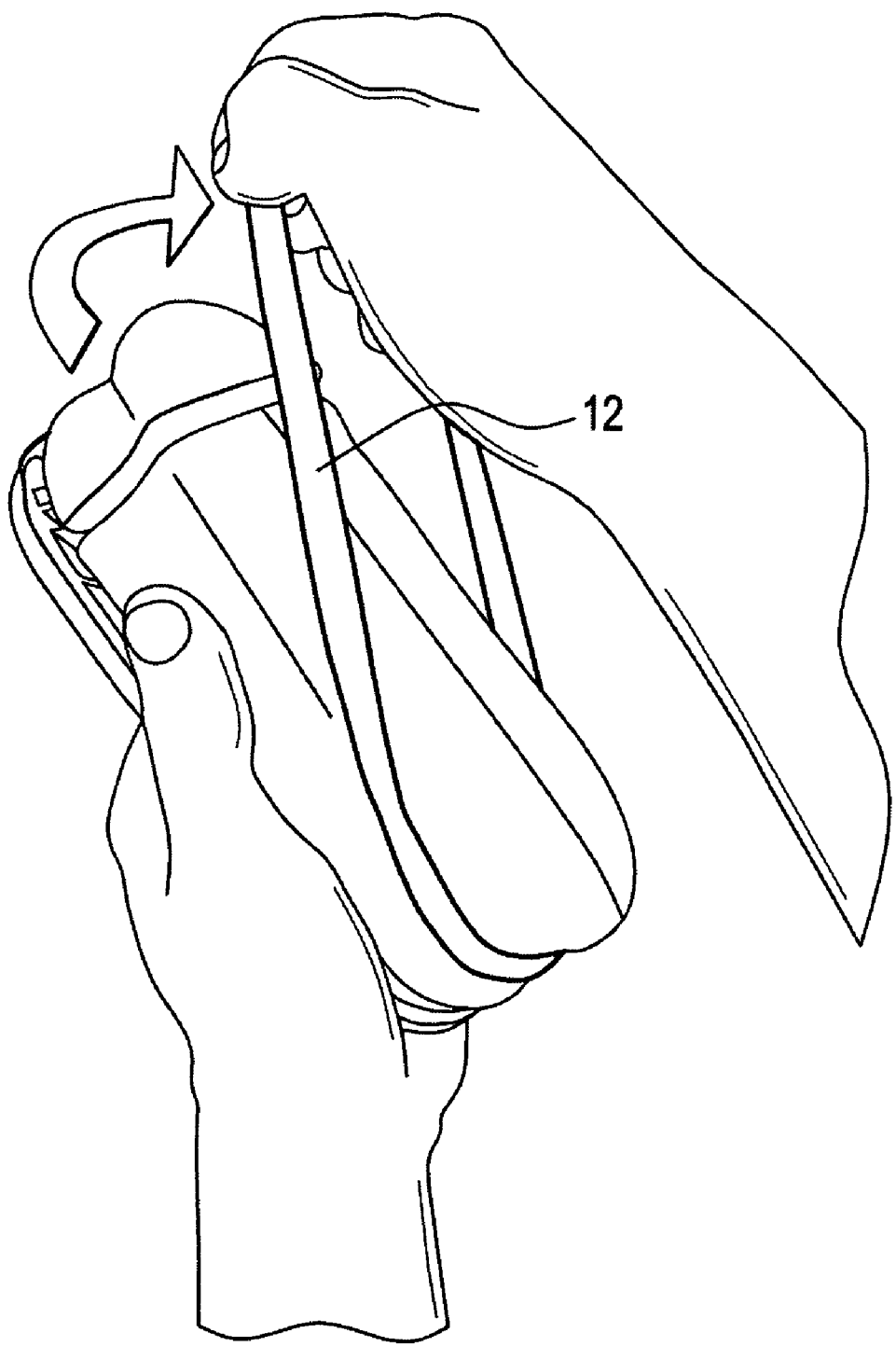
Figure 14:
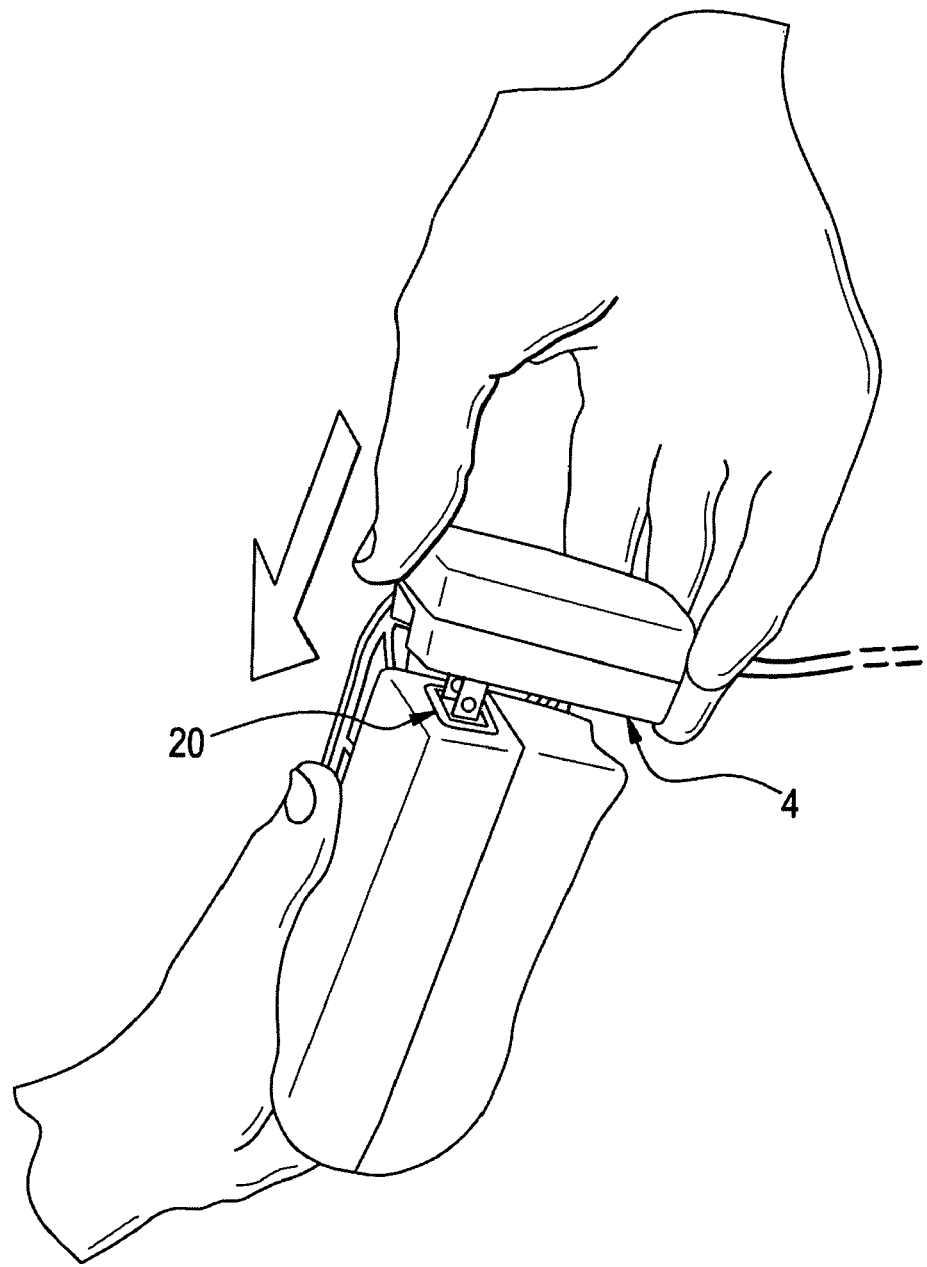
Figure 15:
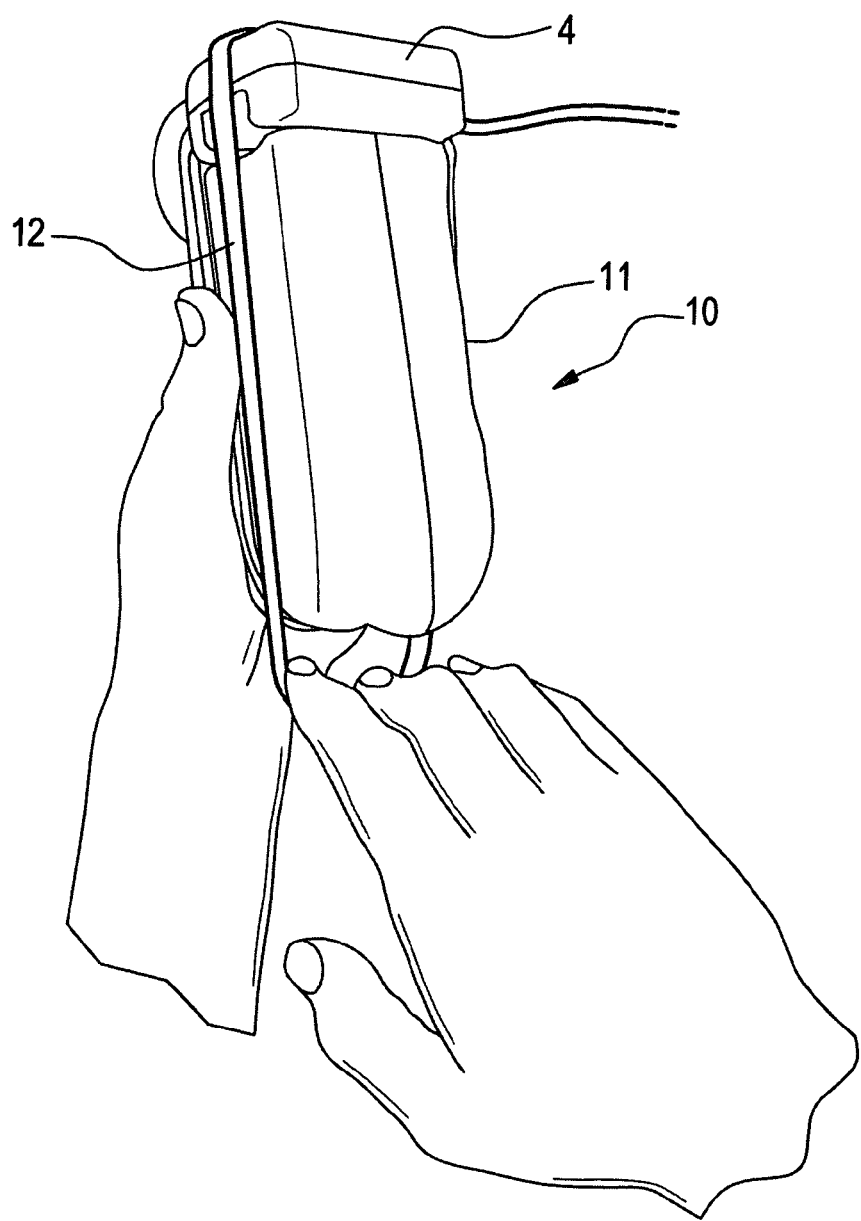

Now, with reference to FIGS. 11-17, an explanation of the operation of the first embodiment illustrated in FIGS. 1-3 will now be made. FIG. 11 shows the device 10 held in the palm of the user's hand 1. An elastic band 12 is stretched across the housing 11 and grasping handle 25 to hold them in the position shown. As shown in FIG. 12, the elastic band 12 is removed and then with reference to FIG. 13, the grasping handle 25 is pivoted about the coupling 29, whereupon the plug and transformer 4 of a charger for an electrical device is plugged into the receptacle 20 (FIG. 14). Thereafter, the band 12 is restored this time surrounding the charger 4 and the housing 11 (FIG. 15). At that point, the flat crank arm 27 is rotated while gripping the grasping handle 25 (FIGS. 16 and 17) to operate the device 10.

With reference now to FIGS. 10a-d, a description of the electrical circuitry will be provided.

Figure 10A:
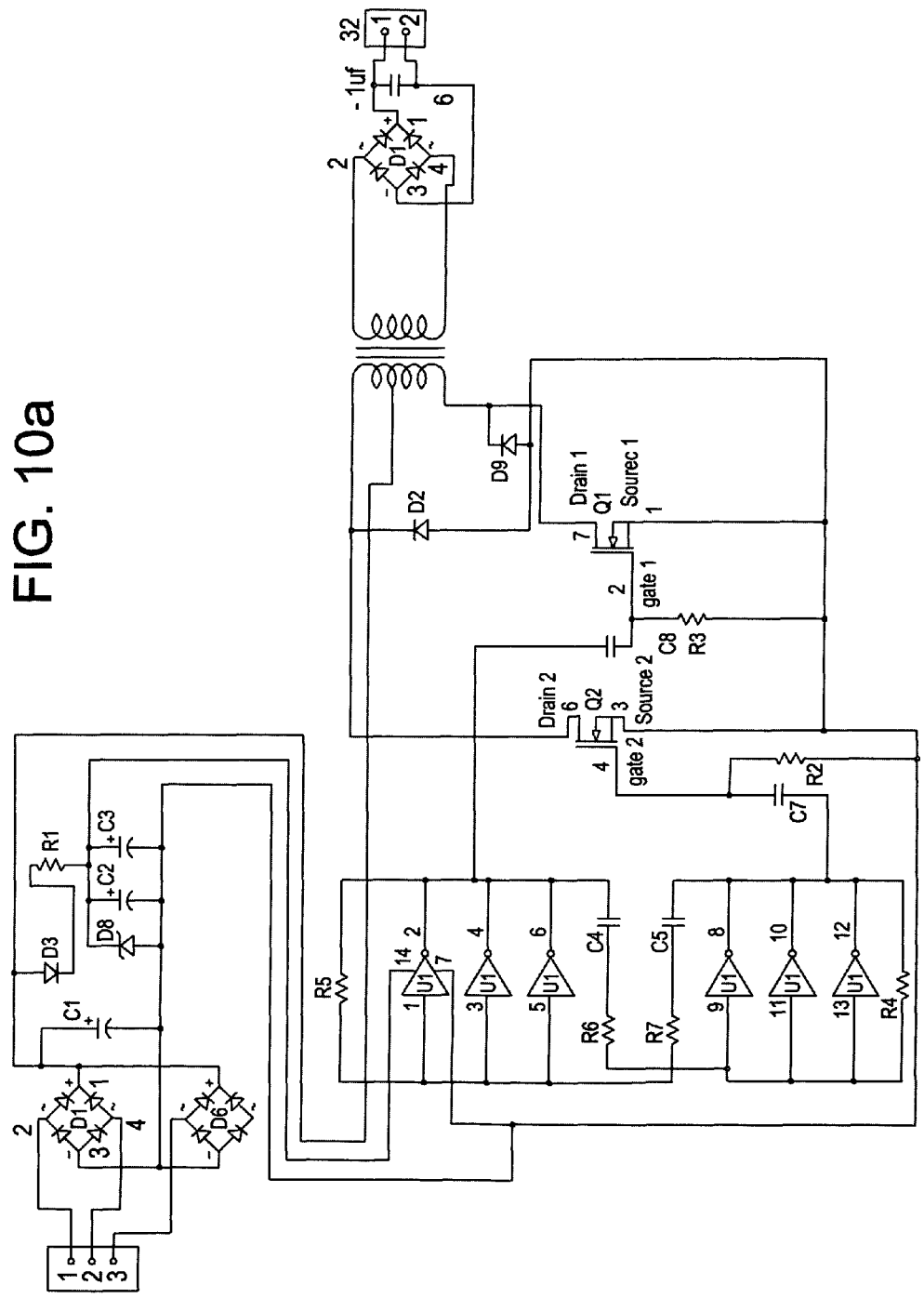
FIG. 10a shows a schematic representation of a first embodiment of electrical circuitry for use in accordance with the teachings of the present invention.

With reference to FIG. 10a, the DC to DC converter circuit schematic is shown. Three phase AC input power is rectified by bridge rectifiers D1 and D6. Capacitor C1 reduces the ripple. Diode D3, resistor R1, diode D8, capacitors C2 and C1 provide a regulated power supply for the CD40106 Hex Schmidt inverter chip. The transformer primary is set up in a full bridge configuration. Mosfets Q1 and Q2 alternate turning on and pulling to ground one side of the primary coil in alternate directions creating alternating current. The center tap of the coil is connected to the positive DC Supply. The gates of the Mosfets are connected in a multi stable vibrator. The frequency of oscillation is set by the RC time constant of resistors R6, R4 and capacitor C4 and resistors R7, R5 and capacitor C5. When the input of inverter pins 1, 3, 5 is high, outputs 2, 4, 6 are low. The inputs 9, 11, 13 will now charge high through resistors R4 and R6 to a high state inverting pins 8, 10, 12 to low and begin the process of charging inputs 1, 3, 5 to high through resistors R5, R7 and capacitor C5. This will continue to oscillate in a free running mode. The Schmidt triggers ensure a clear transition and reliable oscillation operation. The high frequency operation allows a more efficient operation though reduced transformer core losses. A smaller, less expensive transformer will also benefit in size and weight vs. a 50-60 Hz transformer. The secondary voltage of the transformer is stepped up through winding ratios and is then rectified by rectifier D7 and filtered by capacitor C6. This provides an output DC voltage of 110-120 volts at efficiencies up to 93%. Of course, the circuit can be simply modified as understood by those of ordinary skill in the art to provide a 240 volt DC output.

Figure 10B:
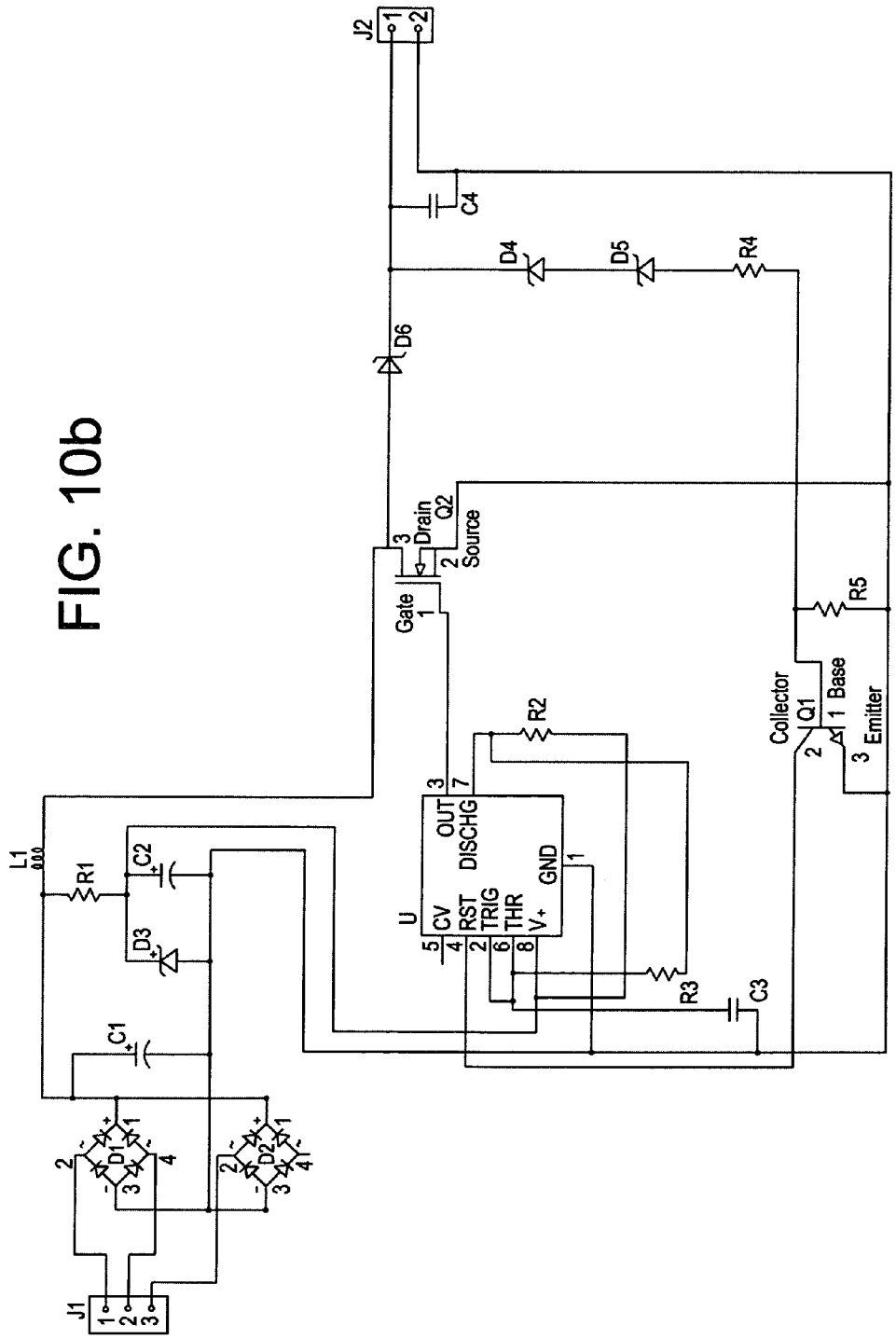
FIG. 10b shows a schematic representation of a second embodiment of electrical circuitry for use in accordance with the teachings of the present invention.

Another method, circuit schematic, shown in FIG. 10b is an inductor boost circuit. Again the three phases are rectified with bridge rectifiers D1 and D2 and filtered with capacitor C1. Resistor R1, diode D3 and capacitor C2 to provide a regulated supply for the 555 timer chip. Resistors R2, R3 and capacitor C3 set the frequency of operation on the 555 timer chip. When Mosfet Q2 is on, current flows through inductor L1 and Mosfet Q2. When Mosfet Q2 is turned off, the current in the inductor attempts to maintain its flow and the voltage at pin 3 of Mosfet Q2 is boosted with the magnetic energy stored in the inductor. The voltage will continue to increase until it exceeds the voltage set by the two zener diodes D4 and D5, to about 120 volts DC. Of course, the circuit can be simply modified as understood by those of ordinary skill in the art to provide a 240 volt DC output. Current will now flow into the base of Mosfet Q1 which will turn on and will pull down the reset pin of the 555 timer turning it off until the voltage drops below the regulation point. In this way, the boost circuit will regulate to the set voltage. The output is rectified via diode D6 and filtered by capacitor C4. This circuit achieved efficiencies between 83 and 93% depending on the quality of the inductor used.

For two motors, a third bridge rectifier can be used in addition to rectifiers D1 and D2 in the boost circuit and D1 and D6 in version two. The six inputs of the bride rectifiers are connected to the two generators three phase outputs. The power is combined in DC power after the full bridge rectifiers resulting in a doubling of current and power at the same voltage.

Alternatively, the two generators and circuits are kept isolated and combine their outputs, the common of one connected to the high end of the other. This doubles the voltage and keeps the current the same.

More than two generators can be combined the same way. The advantage of using multiple copies in contrast to one large generator and a larger single power circuit is in size, power and cost.

Figure 10C:
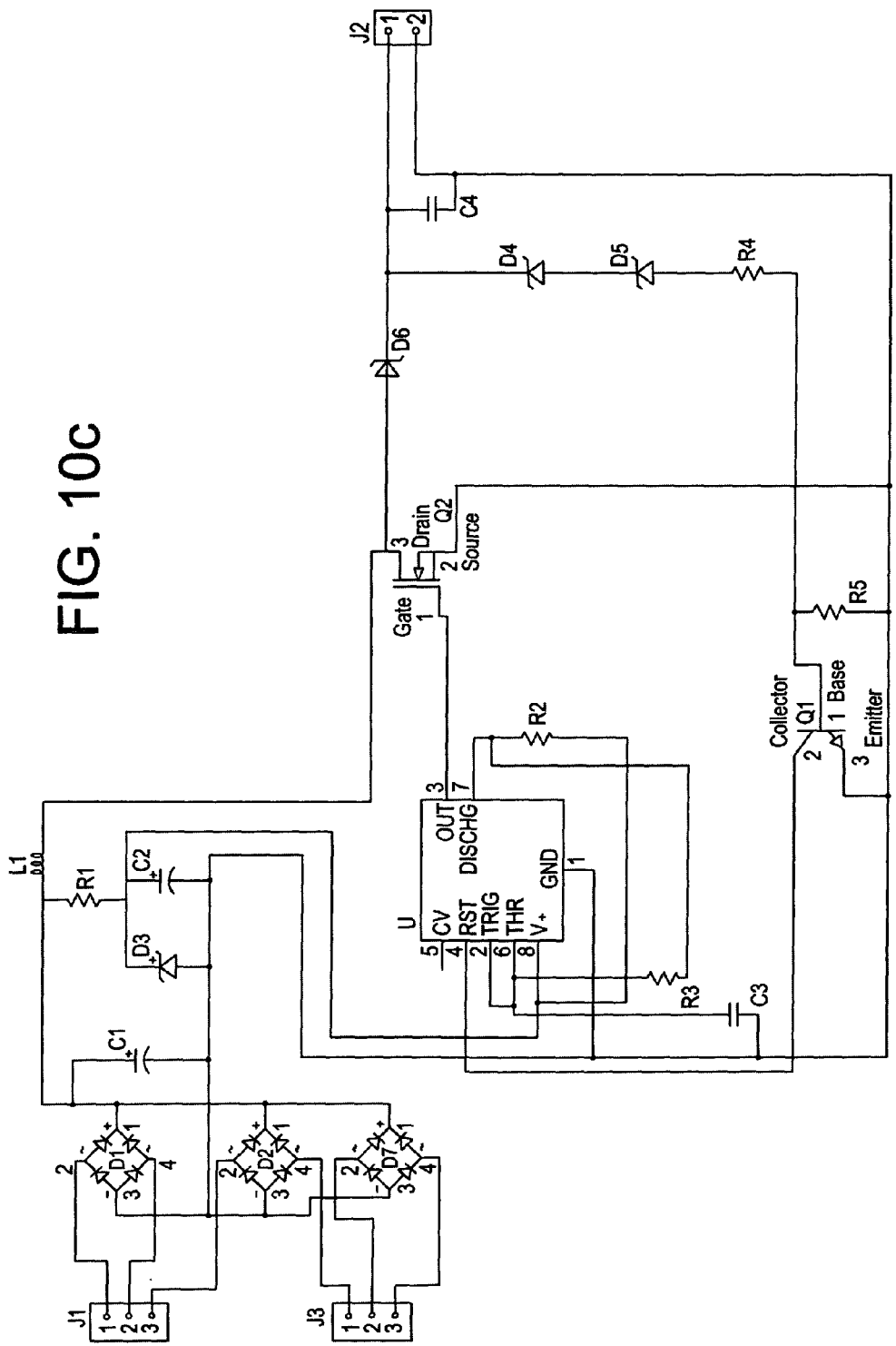
FIG. 10c shows a schematic representation of a first alternative of electrical circuitry in which plural generators are employed in concert.
Figure 10D:
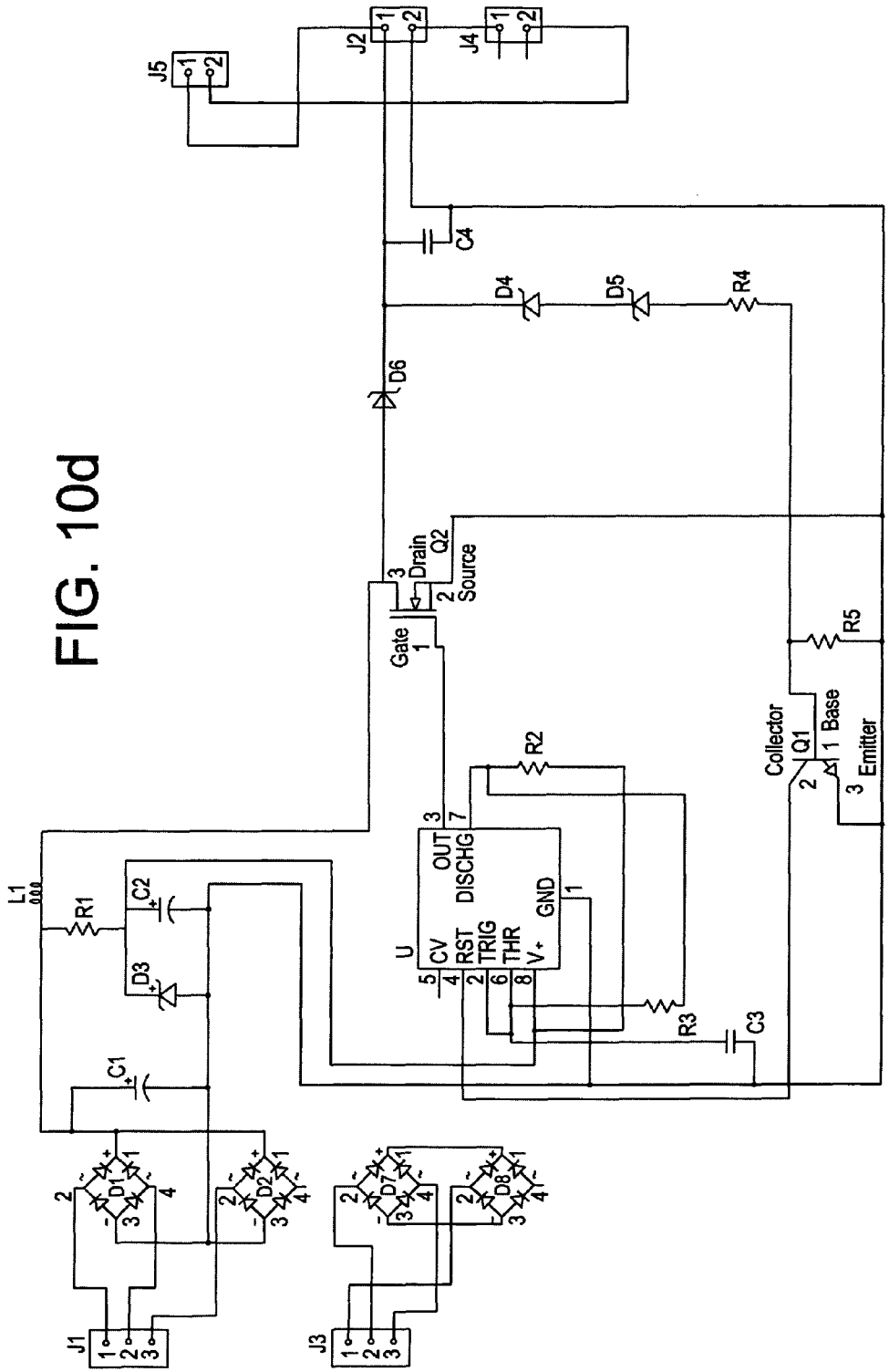
FIG. 10d shows a schematic representation of a second alternative of electrical circuitry in which plural generators are employed in concert.

In the scenario in which two generators are employed, FIGS. 10c and 10d depict two respective alternative circuit diagrams for carrying out the teachings of the present invention.

With reference to FIG. 10c, a second generator input connects J3 to the bridge rectifier pins 4 of D2 and pins 2 and 4 of D7. The electrical power is combined by the pins 1 and 3 of the bridge rectifier D7 connected to the pins 1 and 3 of bridge rectifiers D1 and D2. This combines the current from the two generators and uses one circuit to step up the output to 120 volts or the regulated output voltage. This requires the power components of the circuit to be scaled up to handle the additional current. In the scenario set forth with reference to FIG. 10c, a plurality of sub-systems each consisting of the combination of a generator and its associated electrical circuit are connected in parallel.

A second alternative is shown in FIG. 10d. In this alternative, the second generator J3 is connected to two bridge rectifiers D7 and D8. The DC power output of this independent isolated generator uses a duplicate isolated circuit that is the same as is shown for the first generator J1. Its high voltage DC output is shown on the terminal block J4. The terminal blocks J2 and J4 are combined as shown in FIG. 10d to add their voltage and the new combined additive voltage of the two generators J1 and J3 and the associated circuits is outputted at the terminal block J5. In the scenario set forth with reference to FIG. 10d, a plurality of sub-systems each consisting of the combination of a generator and its associated electrical circuit are connected in series.

Savings in size requirements and cost result from using multiple smaller generators and duplicate circuit boards as opposed to use of one large generator.

Test results from use of the present invention were as follows—all versions were prototyped and the boost circuit was implemented in the production version.

The production boost circuit was first tested with a rheostat and transformer power source.

| Load | Power | Voltage | Current |
| --- | --- | --- | --- |
| 7.5K ohms | 1.8 Watts | 116.4 | 16.2 mA |
| 5K | 2.7 | 116.3 | 24.1 |
| 2.5K | 5.2 | 113.4 | 46.2 |
| 1K | 10.4 | 100.4 | 104.4 |
| Cell phone | 4.2 | 117 | 36.1 |

The single generator was next tested with the generators with Motorola, LG and Samsung cell phone chargers and cell phones, Canon and Nikon cameras, Sony Camcorder, Apple iPod and iPad. In all cases, the power draw for the charger was measured from a standard AC outlet and then from the hand cranked power generator and was the same. Measured Voltage was 117V in the AC and DC cases. Power was the same in both cases, cell phones at 4.2 watts, Cannon camera 6.4 watts, Nikon camera 8.2 watts, Apple iPod 2.5 watts, Apple iPad 10 watts.

An extended test was then conducted. A cell phone was used as the load and it was fully discharged and then charged using a wall outlet. The charging time was 100 minutes. It was then again fully discharged and cranked for 30 minutes. The cell phone indicated a charge state of two of four bars. It was also tested with a 60 W fluorescent light bulb rated at 13 W and operated normally with the single generator. For the 20 watt bike model with stacked circuits, voltage is 237 volts and the power delivered was 19.92 watts to the laptop computer.

The conclusion of the testing is that the devices' charge rates are limited by the chargers and that the hand crank and bike devices provided the same power source as from a wall outlet. The invention is only limited by the devices being charged being within the power range of the generators. As currently designed in the production unit, this includes all known devices.

As such, an invention has been disclosed in terms of preferred embodiments thereof which fulfill each and every one of the objects of the invention as set forth hereinabove, and provide new and useful embodiments of a portable power generator of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. A portable power generator, comprising:
   a) a housing containing a generator system including at least one generator;
   b) an actuator for said generator system extending outside said housing, said actuator converting human force input into rotation of said at least one generator;
   c) electrical power output of said generator system connected to an electrical circuit within said housing, said electrical circuit converting said electrical power output of said generator system into outlet power at about 120 or 240 volts DC; and d) an electrical outlet mounted on said housing and connected to said outlet power.

2. The generator of claim 1, wherein said generator system includes a plurality of generators.

3. The generator of claim 2, wherein said plurality comprises two generators.

4. The generator of claim 3, wherein said generators are connected in parallel.

5. The invention of claim 2, wherein each of said generators is connected to its own electrical circuit, said combinations of generator and electrical circuit being interconnected with one another in series.

6. The invention of claim 2, wherein each of said generators is connected to its own electrical circuit, said combinations of generator and electrical circuit being interconnected with one another in parallel.

7. The generator of claim 1, wherein said actuator comprises a hand crank.

8. The generator of claim 7, wherein said hand crank includes a crank arm and a handle pivotably connected to said crank arm.

9. The generator of claim 8, wherein said handle is pivotable from a first position at which it lies adjacent an end of said housing to a second position at which said handle is separated from said housing by said crank arm.

10. The generator of claim 9, wherein said handle is connected to said crank arm via a coupling mechanism, said coupling mechanism including a flat body with opposes recesses, said crank arm including a detent engageable with either of said recesses to releasably lock said handle in said first position or second position.

11. The generator of claim 1, wherein said outlet power is at about 120 volts DC.

12. The generator of claim 11, wherein said electrical outlet comprises an outlet with two connector ports.

13. The generator of claim 1, wherein said outlet power is at about 240 volts DC.

14. The generator of claim 13, wherein said electrical outlet comprises an outlet with two connector ports.

15. The generator of claim 1, wherein said actuator comprises a pair of opposed cranks.

16. The generator of claim 15, wherein said generator system includes two generators.

17. The generator of claim 16, wherein each of said opposed cranks includes a foot pedal mounted thereto.

18. The invention of claim 17, wherein said pedals are 180 degrees offset with respect to one another.

19. A portable power generator, comprising:
a) a housing containing a generator system including a generator;
b) an actuator for said generator system extending outside said housing, said actuator converting human force input into rotation of said generator, said actuator comprising a hand crank including a crank arm and a handle pivotably connected to said crank arm, said handle being pivotable from a first position at which it lies adjacent an end of said housing to a second position at which said handle is separated from said housing by said crank arm;
c) electrical power output of said generator system connected to an electrical circuit within said housing, said electrical circuit converting said electrical power output of said generator system into outlet power at about 120 or 240 volts DC; and
d) an electrical outlet mounted on said housing and connected to said outlet power.

20. The generator of claim 19, wherein said handle is connected to said crank arm via a coupling mechanism, said coupling mechanism including a flat body with opposes recesses, said crank arm including a detent engageable with either of said recesses to releasably lock said handle in said first position or second position.

21. The generator of claim 19, wherein said outlet power is at about 120 volts DC.

22. The generator of claim 21, wherein said electrical outlet comprises an outlet with two connector ports.

* * * * *